United States Patent [19]

Burgess et al.

[11] 3,775,711
[45] Nov. 27, 1973

[54] MICRO FILM DUPLICATING DEVICE

[75] Inventors: Dennis A. Burgess; Charles E. Alexson; Ralph P. Jones; all of Minneapolis, Minn.

[73] Assignee: Microm, a Division of Colight, Inc., Minneapolis, Minn.

[22] Filed: May 26, 1972

[21] Appl. No.: 257,135

[52] U.S. Cl. ............... 355/100, 352/174, 355/64, 355/91
[51] Int. Cl. .......................................... G03b 27/30
[58] Field of Search ........................... 355/99–103, 355/91, 94, 64; 352/159, 174, 176; 95/58

[56] References Cited
UNITED STATES PATENTS

| | | | |
|---|---|---|---|
| 3,288,047 | 11/1966 | Limberger | 355/100 |
| 3,509,807 | 5/1970 | Sutton et al. | 355/64 X |
| 1,099,694 | 6/1914 | Dreyfoos | 355/101 |
| 3,583,799 | 6/1971 | Walter | 352/176 X |
| 2,630,743 | 3/1953 | O'Kane | 352/176 X |
| 3,320,867 | 5/1967 | Miller | 355/99 X |

Primary Examiner—Richard L. Moses
Attorney—Everett J. Schroeder

[57] ABSTRACT

The disclosure is directed to a machine in which a roll of heat sensitive film is drawn across an exposing mechanism which uses a film carrier for holding the negative which is to be copied, the film and negative being held in contact with each other through the use of a pressure differential device. The film is exposed through the use of a mercury vapor lamp, the rays of which are controlled through a shutter surrounding the lamp. A pair of metering rolls moves the film past a cutter which cuts it to the proper length, at which time it is conveyed through a developer and upon emerging from the developer, an air knife cools the film where it is delivered through the use of a conveyor to a collecting station.

23 Claims, 4 Drawing Figures

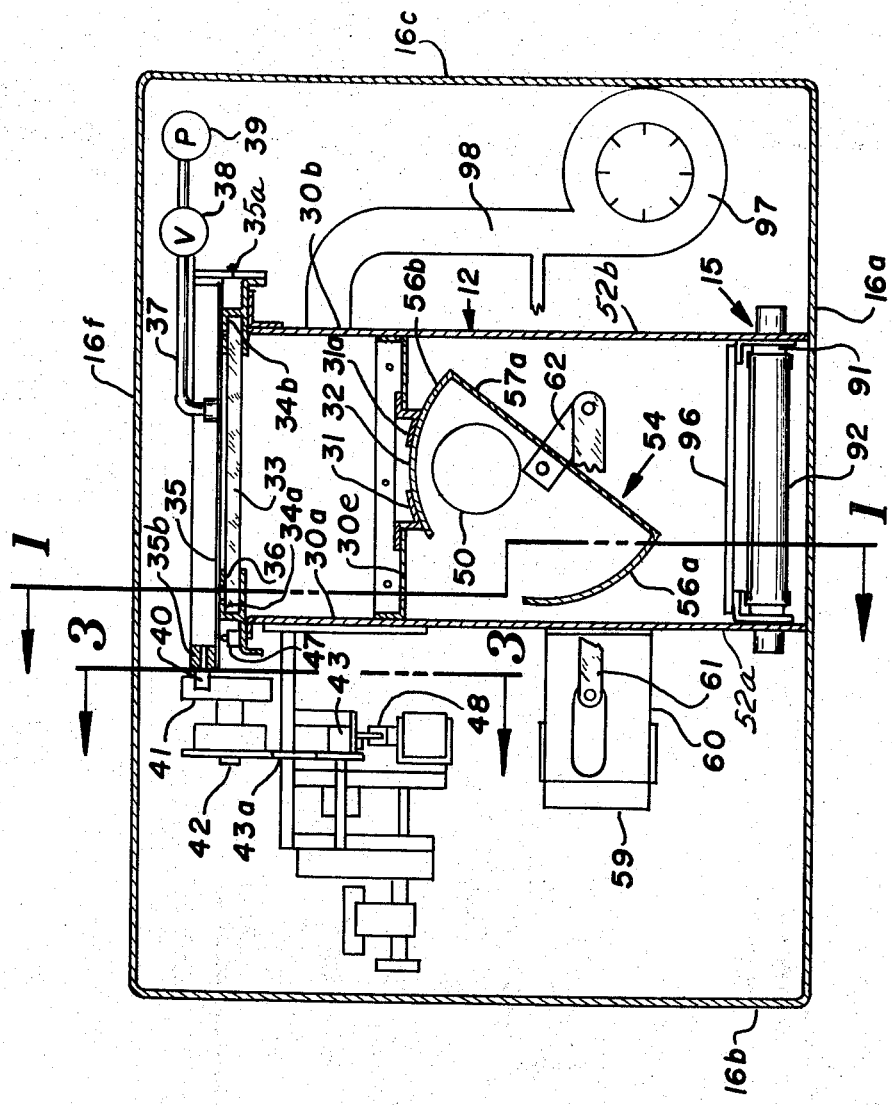
FIG. 2
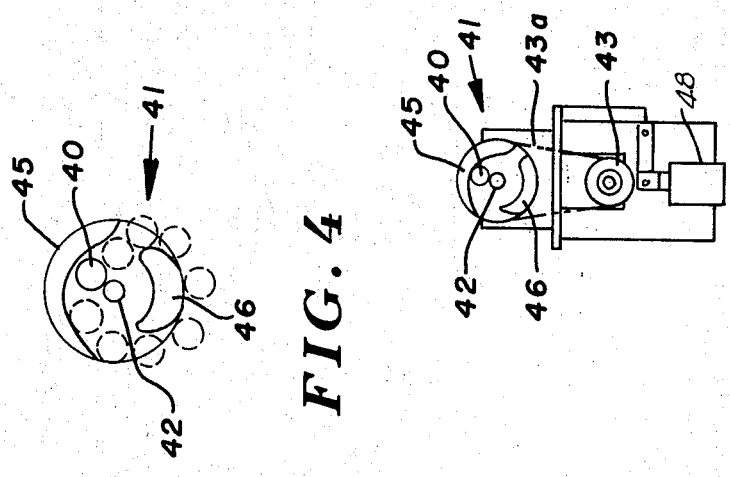
FIG. 4
FIG. 3

MICRO FILM DUPLICATING DEVICE

Applicant's device, as disclosed herein, provides a microfilm duplicating device having means for automatically metering lengths of film to be exposed into an exposure area and thereafter exposing the same and cutting only the exposed portion from the film and advancing only this portion of the film to a developing and clearing area for ultimate discharge from the device. A particular advantage of applicant's device is the utilization of a roll supply of film and an independent advancing arrangement such that, to expose a single section of film it is not necessary to provide a "leader" through the entire unit. With devices which utilize an entire leader through the system a great deal of film is lost when a single exposure is required.

With the device, as illustrated, the exposure light serves a dual purpose of exposing the film and setting or clearing the film after the same has been developed. The arrangement of such dual functioning obviously eliminates a two station device and therefore permits a reduction in length over such two station devices and eliminates the duplicity in light sources which would otherwise be required.

It is therefore an object of applicant's invention to provide a microfilm exposure device which provides for automatic advancement of film through the exposure mechanism.

It is a further object of applicant's invention to provide a microfilm duplicating device which is provided with metering roll devices such that a specific advance of film through the exposure mechanism may be maintained.

It is still a further object of applicant's invention to provide a microfilm duplicating and development device which includes means for exposing a selected length of film and thereafter developing this same length of film without requiring that a film leader be provided.

It is still a further object of applicant's invention to provide a duplicating device for microfilm which includes a light source for exposing the film and which utilizes this same light source for clearing the film after development of the same.

It is still a further object of applicant's invention to provide a microfilm duplicating device having means for developing the exposed film included therein such that the exposing and development of the film may be accomplished in a single unit.

These and other objects and advantages of applicant's invention will more clearly appear from the accompanying description and drawings in which the same numeral is utilized to identify the same or similar parts throughout the several views and in which:

FIG. 2 is a generally vertical section taken substantially along Line 2—2 of FIG. 1;

FIG. 3 is a partial vertical section taken substantially along Line 3—3 of FIG. 2; and, FIG. 4 is a detail of a portion of FIG. 3 and being drawn to an enlarged scale.

Figure 1:
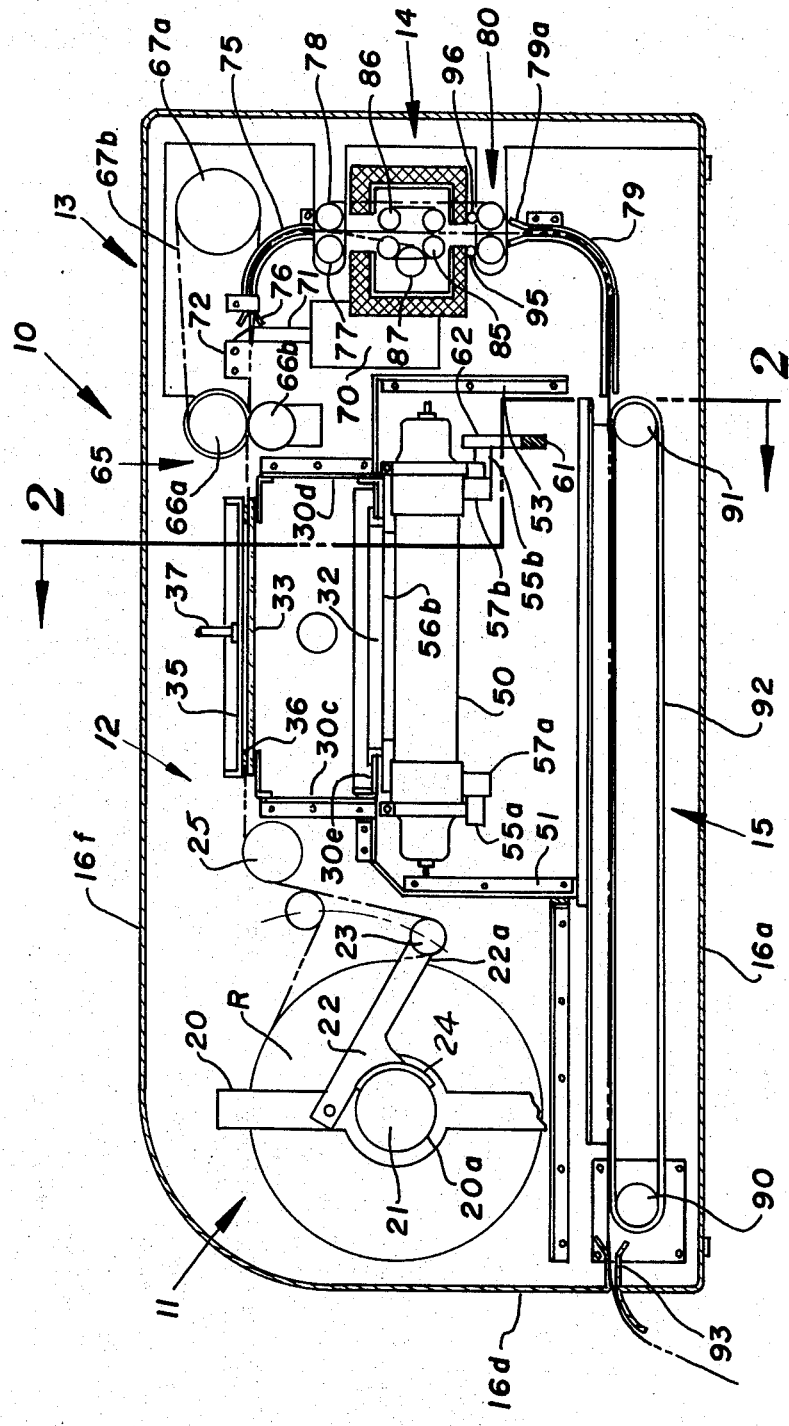
FIG. 1 is a longitudinal cross section taken substantially centrally of the device along Line 1—1 of FIG. 2.

In accordance with the accompanying drawings, the microfilm duplicating device embodying the concepts of applicant's invention is designated in total as 10 and includes as its principle sections, a material supply section 11, an exposure section 12, a metering and cut off section 13, a developing section 14 and a clearing and return section 15. All of these sections are maintained in their proper relation with framing members which may be incorporated into a containing cabinet 16 having a bottom 16a, sides 16b, 16c, ends 16d, 16e and an access providing top 16f.

The material supply section 11 provides means for mounting a roll R of photosensitive material in position to feed into the exposure section 12 and a pair of material support elements 20 are provided only one such element shown in FIG. 1 but obviously such supports are necessary on both of the respective ends of the roll R. This material support 20 is arranged vertically and naturally extends to a proper supporting frame although the support is broken to illustrate certain more pertinent aspects of the unit. This member 20 provides means for mounting the feed roll R by, for example, providing a roll core 21 carried by aperture 20a. Naturally means must be provided for ease of loading and unloading the roll R.

In order to prevent the roll from continuously rolling when material is being drawn therefrom and to maintain proper material tension a braking and tensioning bar 22 is pivotally mounted on the support members 20 and a pivotally mounted roller member 23 extends between the ends 22a of the bars 22 to extend transversely across the material being fed. The tension bar 22 is also provided with a braking shoe 24 arcuate in shape and arranged relative to the roll core 21 to ride thereon and thereby control the rotation thereof when the material obtains a certain degree of slack. This tensioning and braking system permits material to be drawn from the roll R and after the proper amount of material has been drawn therefrom, if the roll R stops the brake is not required but if the roll R continues to roll, the tensioning and braking system will be dropped to the solid line position of FIG. 1 and brake against the core to prevent further rotation thereof.

Arranged in receiving relation to the tensioning bar 22 and roller member 23 is a first idler member 25 upon which the material to be exposed will roll over before the exposure thereof in the exposure section 12. This member 25 is arranged to supply the material in a relatively horizontal relation but slightly above the master such that as the film is advanced it will not rub or scratch against the same.

The exposure section 12 includes a first frame section with walls 30a, 30b extending to the bottom 16a of the unit and closing end walls 30c, 30d which four walls form an exposure light passage. The light enters this section through a bottom panel 30e which is provided with an insert portion 31 having an arcuately formed lower section 31a which provides a longitudinally oriented light passing aperture 32. This arcuate formation permits selective opening to an exposure light as will be explained hereinafter.

A film and master clamping and exposure arrangement is provided on the upper ends of the formed passage and includes a first light passing surface such as a glass plate 33 or the like held to the passage end with flange elements 34a, 34b. A closure member 35 is hingedly mounted as at hinge 35a for upward and downward movement with respect to the light passing surface 33 and sealing means 36 is provided between the upper surface of plate 33 and the closure member 35 such that a vacuum may be applied therethrough for proper clamping of the cover 35 to the surface 33 whereby the film to be exposed and the master from which the exposure is to be made will be in intimate contact. The vacuum is supplied between these members through a vacuum conduit 37, a valve 38 and a vacuum pump 39. The vacuum introducing system is controlled for the introduction of vacuum at predetermined times and in a predetermined sequence with regard to the other various portions of the unit as will be explained hereinafter.

Means for lifting the cover member 35 is arranged on the front edge 35b thereof. The cover 35 is lifted such that material may be advanced therethrough and when the machine utilizes its automatic functions the lifting is cycled in accordance with the other portions of the unit. In order to accomplish this controlled lifting a cam follower 40 is provided on this front edge 35a and a camming and locking member 41 is mounted for actuation thereof. This cam and follower are particularly illustrated in FIGS. 3 and 4 and in this form, the cam is mounted for rotation on an axis 42 and a drive motor 43 and drive belt 43a is provided for controlled rotation thereof. The particular shape of the cam 41 includes a closing and locking section 45 and an opening section 46. Although other forms of camming surfaces could be provided, in this form, the closing and locking section includes an inner camming surface having a gradually decreasing radius such that as the cam follower enters the same it will effectively draw the cover 35 downwardly into close fitting contact with the light transmitting surface 33. From the illustration of FIG. 4 it is obvious that the cam follower 40 is drawn and held down during one-half of the rotation of the cam 41 and thereafter the same is released and permitted to lift from contacting position. This lifting may be assisted by a biasing member 47.

The lifting of the cover 35 is assisted by the cam opening section 46. In continued rotation the cam follower 40 now rides upon the exterior surface of section 46. This lifting is sufficiently high and sufficiently long in duration to permit material to be advanced across the exposure section 12.

It should be noted that a sensing device is arranged adjacent the drive motor 43, such sensor designated 48 and this sensor serves as an actuating element to coordinate the various timing that is necessary for the other portions of the units. One such controlled function is the introduction of vacuum to the exposure mechanism. When the cam follower 40 has brought the cover down to a selected height such that the vacuum will be effective, this sensor controls valve 38 to admit vacuum to the exposure mechanism and will like wise cut off the vacuum when the cam follower is being released.

If it is desirable to manually operate the unit but primarily for the changing of the master utilized in the exposure, the cover 35 may be lifted whenever the cam is not in its locking position.

The exposure section 12 also includes a light source 50 arranged below the aforementioned aperture in the insert 31 of the bottom wall 30e of the light passage. This light is mounted on the various frame portions provided and additional frame portions such as partitions 51, 52a, 52b and 53 are provided to shield the remaining sections of the unit from the emitted light. It should be noted that no such partition exists below the light but rather that the light is available to the clearing and return section 15.

In order to control the light, a rotatable shutter 54 is mounted on stationary pivots 55a, 55b. The shutter basically consists of a pair of arcuately formed and arcuately spaced, longitudinally extending shutter elements which are designed to conform to the arcute shape of the insert 31 such that light will not pass through the aperture 32 when either of the shutter elements 56a, 56b are underlying the same. These shutter elements 56a, 56b are joined only at their ends with connector elements 57a, 57b which leaves the entire bottom of the shutter 54 open to continually pass light to the section 15. The movement for the shutter 54 is obtained with a lever-eccentric system driven by a motor 59 mounted on a support frame 60 with the first lever portion 61 being eccentrically mounted on the output shaft of the motor 59 with the second lever portion 62 pivotally mounted on the end thereof and further connected to the shutter for rotation thereof. The important consideration in this eccentric relation and shutter operation is that the shutter aperture begins its movement slowly, speeds up as it approaches the center and then decelerates after it passes center. The reasoning for this situation is that, the light being cylindrical, weaker rays exist at the outer portions of the aperture which therefore requires a longer exposure than that center portion where the rays are stronger, thereby requiring a shorter exposure time in order to obtain a proper exposure entirely across the area. When the shutter begins its movement slowly it allows more light rays to strike the edges of the area to be exposed and as it speeds up it allows fewer of the stronger rays to this same area.

Further with this type of lever control the shutter 54 will oscillate back and forth across the exposure area thereby permitting the opposite side to be open and pass light to the area for setting and clearing of the film arranged therebelow.

The metering and cut off section 13 includes a first set of metering, driving rollers 65 consisting of a hard surface, precisely determined such that exact movement of the film is obtained. This metering roller is designated 66a and the back up roller therefore 66b. Drive means including a motor and belt 67a, 67b is provided to drive the metering roller 66a. This drive system is controlled by the cam follower 41 position such that when the cover 35 is lifted the film is precisely advanced. This metering roller is utilized when precise advancement is necessary but the scope of the invention includes systems wherein such exactness is not required and therefore other rollers could be utilized.

The metering and cutoff section 13 also includes a cutting device 70 having a cutting blade 71 operating in cooperation with a backing device 72 to cut the film as the same is passed therethrough. This cutoff system is precisely located as closely as possible to the original film being duplicated such that only a single length of film is wasted every time the machine is turned on. The system is also precisely timed for this same reason.

Between the metering and cutoff section and the development section 14 and again following the developer are film transport sections which are designed to transport the cut film to and from the development section 14. In the form shown this transport section includes a first film receiving section 75 consisting of a chamber having dimensions to accomodate the cut film and having an inlet flare portion 76 to receive the film and being arcuately formed to transfer the motion thereof from a generally horizontal direction to a generally vertical direction. A first set of intermediate drive rollers 77, 78 are provided at the outlet of this first section 75 to receive the film and deliver it to the developer 14. Immediately following the developer 14 a second transport section 79 is provided which section again is provided with a flared inlet 79a and a second set of rollers 80 are arranged at such inlet thereof to further advance the same to the return section 15. This multiple delivery section is important as only single lengths of film are delivered therethrough and the distance between the rollers permits transfer from one to another of the individual film sections. Section 79 is arranged to deliver the film from a generally vertical path of travel to a generally horizontal position for feeding the same to the return section 15.

The developing section 14 includes two sets of rollers designated 85, 86, one set being arranged on each side of the film travel path. A continuous belt 88 extends around one set of rollers 85, and extends to drive the rollers of the transport sections.

The developer is a heat developer and the rollers are timed and arranged such that there is no relative movement between the film and the rollers which could cause scratching of the same. The design of the developer also serves the function of straightening the film. As the same comes off the supply roll it has a curled memory. Heating the film within the developer and moving it through the developer in a straight line removes this curl.

Immediately following the developer 14 are a set of air knives 95, 96. These knives consist of tubular sections arranged on either side of the film travel path and extend entirely transversely thereacross. Air passages are provided radially through the knives to direct air at the film. Air is provided to these knives and also to the aforementioned light passage chamber from a fan 97 through conduit 98.

The concept of introducing air to the film is to immediately cool the film and prevent further chemical action. This stoppage of the chemical change in the development process prepares the film for clearing.

The introduction of air into the light passage chamber is to obviously cool the chamber and prevent the initiation of chemical changes in the film.

After passing from the developing section, the film is delivered to the clearing and return section 15. This section includes a conveyor having a pair of spaced rollers 90, 91 with a continuous belt 92 extending therebetween for holding and carrying the exposed and developed film. A flared film exit 93 is provided in receiving relation to the delivery end of the conveyor. It should be noted that the conveyor surface is arranged such that film exiting from the developer and transport section 79 will again be exposed to the light from light source 50. This further exposure light provides a clearing effect to the film such that the resulting product will have a high degree of resolution. Applicant has found that this clearing is highly beneficial for high quality microfilm and the arrangement as illustrated obtains this benefit without any additional light source.

It should be obvious that this final return conveyor means must include a means for driving of the rollers 90 or 91.

When the machine is in use, certain other control means are required for automatic operation and on such obvious control is a counter that will permit preselection of the number of copies that are desired from any particular master. Speed control means may also be employed and it should be obvious that interlocking control means for the operation of the various sections in proper sequence are necessary. These control devices are well known in the art and further explanation of the same is thought to be unnecessary.

In operation of the machine, a selected master is positioned on the light transmitting surface 33 and the film to be exposed is fed into the metering roll section 65. It is necessary to position the cam follower for shifting the cover 35 and thereafter the machine is available or automatic operation. In operation, the cam 40 will draw the follower 41 downwardly into locking position and when the cover 35 is at a proper level the valve 38 is opened and permits the introduction of vacuum to assist further draw down of the cover 35 to properly hold the master in position and particularly the film to be exposed thereto. When the cover is so positioned, the shutter device normally blocking light transmission is rotated to now expose the film. After such exposure, the cover is lifted, the vacuum having been opened to permit the same and this lifting permits the metering of an unexposed film section into the exposure area. After such metering the cutoff action is initiated and the exposed film is shifted through the transport into the developer and finally to the delivery conveyor. It should be obvious that, due to the spacing of the cutoff section from the exposure section the first section of film passing through the section will not be exposed but this is a minimal loss as compared to those systems that employ a long leader strip. With applicant's unit there is only the loss of one film section at the forward and rear end of any run of exposures.

A system for vacuum clamping the film to properly position the same for exposure has been explained and described. It should be obvious that this vacuum simply provides one of many means for holding the film to the negative or master and simple mechanical devices which may include resilient surfaces on the cover will perform this same function is a sufficiently positive mechanical clamping device if utilized and the lifting and clamping device disclosed is sufficiently capable of performing this function.

It should be obvious that a unique microfilm exposure device has been provided that incorporates an entire exposure, developing and clearing operation into a single compact unit that utilizes an exposing light for not only exposing but also for clearing and setting the developed film.

What I claim is:

1. A microfilm duplicating device including:
   a. a frame;
   b. a film exposure mechanism having an exposure area mounted on said frame and including a first light passing surface and a cover member movable with respect to said light passing surface and closing thereagainst;
   c. film supply means constructed and arranged to deliver film to said exposure mechanism;
   d. means for delivering selected lengths of film to said exposure mechanism;
   e. means for selectively moving said cover member with respect to said surface to permit film to be moved therebetween and for positively contacting the film upon closure;
   f. means for elevating the film above said exposure area when said cover member is lifted to permit film to be moved therepast while not contacting the exposure area;

g. a light source mounted to direct exposing light through said light passing surface; and, h. shutter means for controlling the transmission of light to the film to be exposed.

2. The structure set forth in claim 1 and means for supplying vacuum between said light passing surface and said cover member.

3. The structure set forth in claim 1 and cutoff means for cutting the film after exposure thereof.

4. The structure set forth in claim 3 and said cutoff means being arranged adjacent said film delivery means to permit cutting of a single length of exposed film.

5. The structure set forth in claim 1 and said delivering means including metering roller members.

6. The structure set forth in claim 1 and developer means arranged to receive film after exposure thereof.

7. The structure set forth in claim 6 and said developer means including:

a. heat developing means;

b. a housing;

c. film conveying means arranged to receive the film and convey the same while holding the same in substantially planar relation whereby film delivered therefrom will be substantially flat.

8. The structure set forth in claim 7 and cooling means arranged adjacent the outlet of said developer means for immediately cooling the film delivered therefrom.

9. The structure set forth in claim 6 and conveyor means arranged to receive the film after development thereof, said conveyor being arranged to move the film through light transmitted from said light source.

10. The structure set forth in claim 6 and film transport means arranged to receive the exposed, cut film and deliver the same to said developer.

11. The structure set forth in claim 10 and said film transport means including film driving members spaced along said transport means the spacing therebetween providing continuous movement of the film.

12. The structure set forth in claim 1 and said cover moving means including;

a. a cam follower on said cover; and, b. a cam member with means for driving the same and arranged and constructed to capture said follower and draw the cover into close contact with said surface during a portion of its movement and lifting said cam follower during a portion of its movement thereby shifting said cover from said surface.

13. The structure set forth in claim 1 and said shutter means including:

a. a light transmitting aperture defined in a first light shielding member which member is arranged between said light source and said light passing surface;

b. a rotatably mounted shutter device including a pair of spaced light blocking elements defining a light transmitting aperture therebetween; and c. means for oscillating said shutter device.

14. The structure set forth in claim 13 and said means for oscillating said shutter device including:

a. drive means including a source of rotary power;

b. eccentrically mounted lever means between said rotary power source and said shutter device whereby said shutter is opened at a first speed, said speed is increased over a second portion of movement and said speed is decreased as said shutter closes.

15. The structure set forth in claim 1 and control means permitting film delivery only when said cover member is moved from closed position with respect to said surface.

16. The structure set forth in claim 1 and control means shifting said shutter upon closure of said cover member.

17. A microfilm duplicating device including:

a. a frame;

b. a film exposure mechanism having an exposure area mounted on said frame and including a first light passing surface and a cover member movable with respect to said light passing surface and closing thereagainst;

c. film supply means constructed and arranged to deliver film to said exposure mechanism;

d. means for delivering selected lengths of film to said exposure mechanism;

e. means for selectively moving said cover member with respect to said surface to permit film to be moved therebetween and for positively contacting the film upon closure;

f. a light source mounted to direct exposing light through said light passing surface;

g. shutter means for controlling the transmission of light to the film to be exposed;

h. developer means arranged to receive film after exposure thereof; and i. conveyor means arranged to receive the film after development thereof, said conveyor being arranged to move the film through light transmitted from said light source.

18. The structure set forth in claim 17 including means for supplying a pressure differential between said cover member and said frame.

19. The structure set forth in claim 17 including cutoff means for cutting the film before development thereof.

20. The structure set forth in claim 19 wherein said cutoff means is disposed adjacent said film exposure mechanism.

21. The structure set forth in claim 17 including means for elevating the film above said exposure area when said cover member is lifted to permit film to be moved therepast while not contacting the exposure area.

22. The structure set forth in claim 17 wherein said developer means includes:

heat developing means, and film conveying means arranged to receive the film and convey the same adjacent said heat developing means while holding the same in substantially planar relation whereby film delivered therefrom will be substantially flat.

23. The structure set forth in claim 22 including cooling means arranged adjacent the outlet of said developer means for immediately cooling the film delivered therefrom.

* * * * *